US012053736B2

(12) United States Patent
Puxty et al.

(10) Patent No.: US 12,053,736 B2
(45) Date of Patent: Aug. 6, 2024

(54) PROCESS FOR REGENERATING A LIQUID ABSORBENT

(71) Applicant: COMMONWEALTH SCIENTIFIC AND INDUSTRIAL RESEARCH ORGANISATION, Australian Capital (AU)

(72) Inventors: Graeme Puxty, New South Wales (AU); Michael Webster-Gardiner, Hawthorn Court Humble, TX (US); William Conway, New South Wales (AU); Qi Yang, Victoria (AU); Robert Bennett, Victoria (AU); Paul Feron, New South Wales (AU)

(73) Assignee: COMMONWEALTH SCIENTIFIC AND INDUSTRIAL RESEARCH ORGANISATION, Australian Capital Territory (AU)

( * ) Notice: Subject to any disclaimer, the term of this patent is extended or adjusted under 35 U.S.C. 154(b) by 22 days.

(21) Appl. No.: 18/090,614

(22) Filed: Dec. 29, 2022

(65) Prior Publication Data
US 2023/0149850 A1      May 18, 2023

Related U.S. Application Data

(62) Division of application No. 17/292,637, filed as application No. PCT/AU2019/051273 on Nov. 20, 2019, now Pat. No. 11,607,642.

(30) Foreign Application Priority Data

May 2, 2019   (AU) .................... 2019901496

(51) Int. Cl.
*B01D 53/14*      (2006.01)
*B01D 53/62*      (2006.01)
(Continued)

(52) U.S. Cl.
CPC ..... *B01D 53/1425* (2013.01); *B01D 53/1475* (2013.01); *B01D 53/1493* (2013.01);
(Continued)

(58) Field of Classification Search
None
See application file for complete search history.

(56) References Cited

U.S. PATENT DOCUMENTS

2012/0292565 A1   11/2012   Delfort et al.
2014/0094360 A1    4/2014   Saiwan et al.
(Continued)

FOREIGN PATENT DOCUMENTS

AU   2015218491 A1   3/2016
JP   2014-509561 A   4/2014
(Continued)

OTHER PUBLICATIONS

Extended European Search Report issued by the European Patent Office in corresponding patent application 19927033.1 dated Oct. 10, 2022.
(Continued)

*Primary Examiner* — Daniel Berns
(74) *Attorney, Agent, or Firm* — LADAS & PARRY LLP

(57) ABSTRACT

The invention provides a process for regenerating a liquid absorbent, comprising: contacting the liquid absorbent with a hydrophobic medium, wherein the liquid absorbent comprises at least one amine of Formula (I) and degradation product thereof comprising at least one imine of Formula (II), wherein each Ar is independently an aromatic group and each R is independently selected from hydrogen, an organyl group and $NH_2$; and selectively extracting the degradation product into or through the hydrophobic medium.

(Continued)

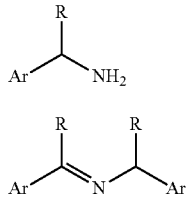

20 Claims, 8 Drawing Sheets

(51) Int. Cl.
    *B01D 53/78* (2006.01)
    *B01D 53/96* (2006.01)
(52) U.S. Cl.
    CPC ............ *B01D 53/62* (2013.01); *B01D 53/78* (2013.01); *B01D 53/96* (2013.01); *B01D 2252/20421* (2013.01); *B01D 2252/20457* (2013.01); *B01D 2257/504* (2013.01)

(56) References Cited

U.S. PATENT DOCUMENTS

2014/0127103 A1  5/2014  Yang et al.
2015/0367281 A1  12/2015 Puxty et al.

FOREIGN PATENT DOCUMENTS

| KR | 2014 0104849 A | 8/2014 |
| WO | 2014/194376 A1 | 12/2014 |
| WO | 2018/213873    | 11/2018 |
| WO | 2018/213873 A1 | 11/2018 |

OTHER PUBLICATIONS

Puxty Graeme et al.: "The evolution of a new class of CO2 absorbents: Aromatic amines", International Journal of Greenhouse Gas Control, vol. 83, pp. 11-19.
Richner Gilles: "Promoting CO2 absorption in aqueous amines with benzylamine", Energy Procedia, vol. 37, Jan. 1, 2013, pp. 423-430.
Japanese Office Action issued on the corresponding Japanese Application No. 2021-530971 dated Nov. 5, 2024.

PROCESS FOR REGENERATING A LIQUID ABSORBENT

CROSS REFERENCE TO RELATED APPLICATIONS

This application is a Divisional of U.S. patent application Ser. No. 17/292,637 filed May 10, 2021 which is a 371 of International Patent Application No. PCT/AU2019/051273 filed on Nov. 20, 2019 which claims priority to Australian Application No.: 2019901496 filed on May 2, 2019 the disclosures of which are incorporated in their entirety by reference herein.

TECHNICAL FIELD

The invention relates to a process for regenerating a liquid absorbent comprising an amine and an imine degradation product thereof. The process comprises contacting the liquid absorbent with a hydrophobic medium, and selectively extracting the degradation product into or through the hydrophobic medium. The process is particularly applicable to the regeneration of amine-based liquid absorbents used to capture $CO_2$ from gas streams, and it will be convenient to disclose the invention in the context of that exemplary application.

BACKGROUND OF INVENTION

Emission of carbon dioxide ($CO_2$) is considered the main cause of the greenhouse effect and global warming. In the Kyoto Protocol the United Nations Framework Convention on Climate Change has set targets for the reduction of greenhouse gas emissions.

One method of reducing atmospheric $CO_2$ emissions is through its capture and subsequent geological storage. In post combustion capture, the $CO_2$ in flue gas is first separated from nitrogen and residual oxygen using a suitable liquid absorbent in an absorber. The $CO_2$ is then removed from the absorbent in a process called stripping, thus allowing the absorbent to be reused. The stripped $CO_2$ is then liquefied by compression and cooling, with appropriate drying steps to prevent hydrate formation. Post combustion capture in this form is applicable to a variety of $CO_2$ sources including power stations, steel plants, cement kilns, calciners, biogas plants, natural gas processing, methane reforming and smelters.

Various aqueous amine and alkanolamine solutions have been investigated as reactive absorbents in post combustion $CO_2$ capture. The capture process involves a series of chemical reactions that take place between water, the amine and $CO_2$. Amines are weak bases, and may undergo acid-base reactions. Once dissolved in the amine solution, the $CO_2$ reacts with water and the neutral form of the amine ($R^aR^bR^cN$) to generate protonated amine, carbonic acid ($H_2CO_3$), aqueous bicarbonate ($HCO_3^-$) ions and aqueous carbonate ($CO_3^{2-}$) ions, according to the generally acknowledged equations described below:

 (equation 1)

 (equation 2)

 (equation 3)

 (equation 4)

 (equation 5)

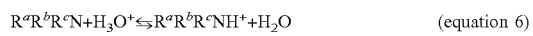 (equation 6)

If the amine is a primary amine (RaRbNH, $R^b$=H) or secondary amine (RaRbNH, $R^b \neq H$), an additional reaction pathway with favourable absorption kinetics becomes available, where carbon dioxide and the amine react to generate a carbamate ($R^aR^bNCOO^-$). The carbamate may also then participate in acid-base chemistry, according to the generally acknowledged reactions described below.

 (equation 7)

 (equation 8)

$CO_2$ desorption during stripping is achieved by heating the aqueous amine solution containing the absorbed $C_2$. Heating reduces the physical solubility of $CO_2$ but more importantly reduces the $pK_a$ of the amine, resulting in a concomitant reduction in pH and $CO_2$ absorption capacity. The extent of reduction in $pK_a$ is governed primarily by the enthalpy of the amine protonation reaction. All the other reactions, including carbamate formation, have small reaction enthalpies and are thus relatively insensitive to temperature. The cyclic capacity of an aqueous amine solution, defined as the moles of $CO_2$ that can be absorbed and released per mole of amine by cycling the absorbent between low temperature and high temperature, is thus strongly dependent on the amine molecular structure, and in particular on its susceptibility to protonation.

Tertiary amines ($R^aR^bR^cN$, $R^a$, $R^b$, $R^c \neq H$) and certain sterically hindered primary or secondary amines have high cyclic absorption capacity but cannot form carbamates in appreciable quantities. The absorption kinetics of these systems is thus relatively unfavourable. Aromatic amines ($R^aR^bR^cN$, $R^a$=aromatic) are insufficiently basic to form carbamates or protonated amine species and are generally unsuitable for $CO_2$ capture.

One consequence of the thermal cycling inherent to amine-based $CO_2$ capture processes is degradation of the amines, and particularly oxidative degradation when $O_2$ is present in the gas stream being treated (as is typical in combustion flue gas or biogas). This leads to loss of performance over time with high costs associated with absorbent regeneration and make-up. Unhindered primary and secondary amines and alkanolamines are particularly susceptible to oxidative degradation. For example oxidative degradation of 30 wt % monoethanolamine (MEA) in coal flue gas environments leads to amine loss of about 1.5 kg/tonne of $CO_2$ captured. The degradation product typically includes organic acids (e.g. formic and oxalic acid) and other polar molecules which are highly soluble in the aqueous absorbent solution. Regeneration must thus be carried out by separating the starting amine from its degradation products by distillation, ion exchange or electrodialysis. The recovered degradation products are discarded as waste.

There is therefore an ongoing need for amine-based liquid absorbent systems with improved stability against degradation and/or amenability to regeneration, yet which still provide satisfactory gas absorption capability. Moreover, it is desirable to provide improved methods of regenerating amine-based liquid absorbents when they have degraded in use.

A reference herein to a patent document or other matter which is given as prior art is not to be taken as an admission that the document or matter was known or that the information it contains was part of the common general knowledge as at the priority date of any of the claims.

SUMMARY OF INVENTION

In accordance with a first aspect the invention provides a process for regenerating a liquid absorbent, comprising:

contacting the liquid absorbent with a hydrophobic medium, wherein the liquid absorbent comprises at least one amine of Formula (I) and degradation product thereof comprising at least one imine of Formula (II):

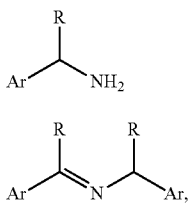

wherein each Ar is independently an aromatic group and each R is independently selected from hydrogen, an organyl group and $NH_2$; and selectively extracting the degradation product into or through the hydrophobic medium.

In some embodiments, the hydrophobic medium is an organic solvent. The organic solvent may be selected from the group consisting of aromatic hydrocarbon solvents, oxygen-containing solvents and halogenated solvents.

In some embodiments, the process further comprises separating the liquid absorbent from the hydrophobic medium and recycling the liquid absorbent to a liquid absorbent stream in a gas absorption process.

In some embodiments, the process further comprises converting the extracted degradation product to form at least one regenerated amine of Formula (I). The regenerated amine may optionally be recycled to a liquid absorbent stream in a gas absorption process.

The conversion of the degradation product may comprise hydrolysing the imine to form a first amount of regenerated amine of Formula (I) and an aldehyde of Formula (III):

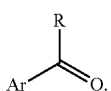

An aqueous solution comprising the first amount of regenerated amine and an organic solution comprising the aldehyde may then be separated by liquid-liquid separation. The aldehyde may then be converted to form a second amount of regenerated amine of Formula (I) by reductive amination. The reductive amination may comprise: i) reacting the aldehyde with hydroxylamine to form an oxime; and ii) reducing the oxime to form the second amount of regenerated amine.

In some embodiments, the liquid absorbent is an aqueous composition comprising at least 10 wt % water.

In some embodiments, the liquid absorbent comprises at least one additional base selected from tertiary amines, hindered amines, carbonate salts, amino acid salts and mixtures thereof having a $pK_a$ greater than the amine of Formula (I). The $pK_a$ is preferably at least 0.25 units higher than that of the amine of Formula (I). As used herein, the $pK_a$ of an amine or other base refers to the $pK_a$ of the corresponding conjugate acid.

In some embodiments, the liquid absorbent comprises at least one aliphatic amine as an absorbent. The aliphatic amine may be selected from unhindered primary or secondary amines and alkanolamines. In such embodiments, the aliphatic amine may comprise monoethanolamine and/or diethanolamine. A molar ratio of the aliphatic amine to the combined total of the compounds of Formula (I) and Formula (II) in the liquid absorbent may be greater than 2:1, such as greater than 5:1, or greater than 10:1.

In some embodiments, the liquid absorbent comprises absorbed carbon dioxide. In some such embodiments, the liquid absorbent may be obtained for contact with the hydrophobic medium from a liquid outlet stream of a carbon dioxide absorber column. Optionally, the liquid absorbent, after extracting the degradation product, may be returned to an outlet stream of a carbon dioxide stripping column.

In some embodiments, the liquid absorbent comprises the amine of Formula (I) in an amount of in an amount of at least 10 wt %, such as from 10 wt % to 80 wt %.

In some embodiments, the liquid absorbent comprises the imine of Formula (II) in an amount of at least 1 wt % before contact with the hydrophobic medium.

In some embodiments, extracting the degradation product into or through the hydrophobic medium reduces the amount of imine of Formula (II) to less than 0.5 wt % in the liquid absorbent.

In some embodiments, each R in Formula (I) and Formula (II) is a hydrogen. In some embodiments, each Ar in Formula (I) and Formula (II) comprises a monocyclic six-membered aromatic group. The monocyclic six-membered aromatic group may comprise at least one nitrogen ring atom. In some embodiments, each Ar is selected from the group consisting of 2-pyridyl, 3-pyridyl, 4-pyridyl and phenyl. In some embodiments, the liquid absorbent comprises 3-aminomethylpyridine.

In accordance with a second aspect, the invention provides a method for absorbing carbon dioxide from a gas stream containing carbon dioxide, the method comprising:

contacting the gas stream with a liquid absorbent comprising at least one amine of Formula (I), wherein the amine of Formula (I) degrades to form a degradation product comprising at least one imine of Formula (II):

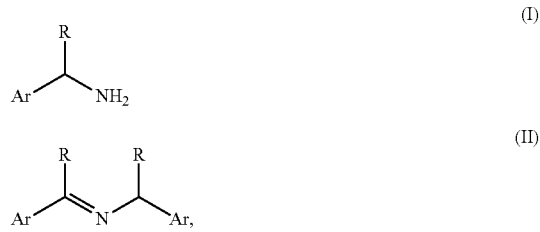

wherein each Ar is independently an aromatic group and each R is independently selected from hydrogen, an organyl group and $NH_2$; and regenerating the liquid absorbent by a process according to any of the embodiments disclosed herein.

In accordance with a third aspect, the invention provides a method for absorbing carbon dioxide from a gas stream containing carbon dioxide and dioxygen ($O_2$), the method comprising contacting the gas stream with a liquid absorbent comprising:

i) at least one amine of Formula (I):

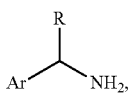

and
ii) at least one aliphatic amine,
wherein the compound of Formula (I) is selectively degraded by the O₂ to form a degradation product comprising at least one imine of Formula (II):

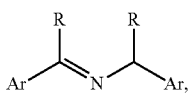

wherein, in the amine of Formula (I) and the imine of Formula (II), each Ar is independently an aromatic group and each R is independently selected from hydrogen, an organyl group and NH₂.

The aliphatic amine is degraded to a lesser extent than would be the case if the method were conducted with an equivalent liquid absorbent lacking the at least one amine of Formula (I).

In some embodiments, the aliphatic amine is selected from unhindered primary or secondary amines and alkanolamines. The aliphatic amine may comprise monoethanolamine and/or or diethanolamine.

In some embodiments, a molar ratio of the aliphatic amine to the combined total of the compounds of Formula (I) and Formula (II) in the liquid absorbent is greater than 2:1, such as greater than 5:1 or greater than 10:1.

In some embodiments, the method further comprises regenerating the liquid absorbent by a process according to any of the embodiments disclosed herein.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
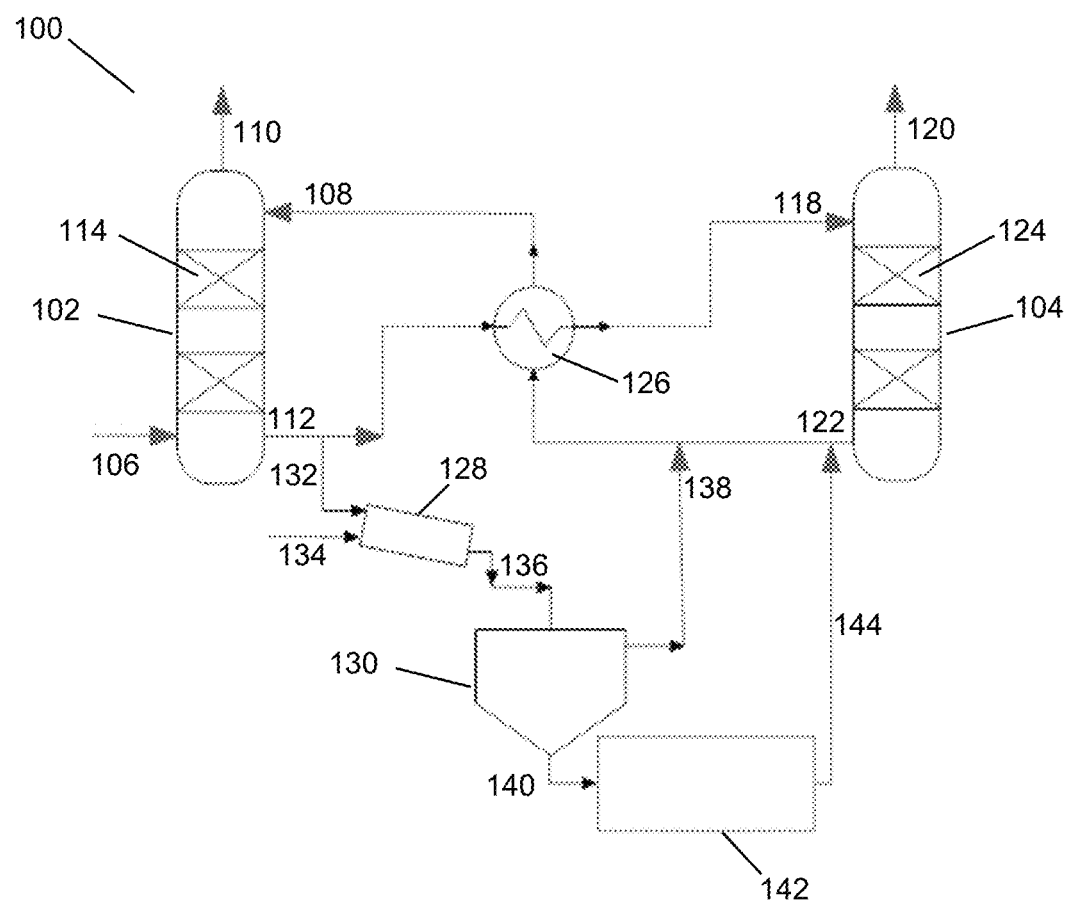
FIG. 1 is a schematic diagram of a system for regenerating a liquid absorbent according to embodiments of the invention, integrated into a process for removing CO₂ gas from a gas mixture.

The present invention relates to gas absorption using amine-based liquid absorbents, for example in a CO₂ capture process. Liquid absorbents comprising amine of Formula (I), such as aminomethylpyridine or benzylamine, provide favourable CO₂ capture performance. The cyclic absorption capacity is similar to that of tertiary or sterically hindered amines but with absorption kinetics more akin to monoethanolamine (MEA). In Formula (I), Ar is an aromatic group and R is selected from hydrogen, an organyl group and NH₂.

The stability of liquid absorbents comprising amine of Formula (I) has been investigated, and it is found that these materials have lower susceptibility to thermal degradation than 30 wt % MEA due to the inherent chemical stability imparted by the aromatic ring structure. Moreover, the oxidative degradation that does occur when absorbents are contacted at elevated temperatures with oxygen-containing gas streams predominantly involves formation of an imine dimer degradation product of Formula (II).

 (II)

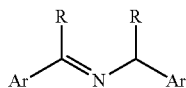

Oxidative degradation to the imine dimer is understood to originate with the protonated amine and follows the scheme shown below (for the specific case of 3-aminomethypyridine):

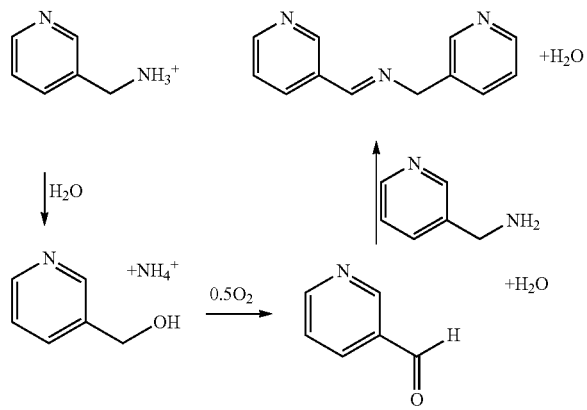

The predominance of this degradation pathway under representative $CO_2$ gas-absorption conditions was considered surprising, since on-purpose imine-forming reactions typically proceed under non-aqueous conditions, with the water reaction product removed from solution and/or the use of a catalyst to obtain appreciable reaction rates and conversions. The selective mode of degradation shown in the scheme is considered unique to amines of Formula (I), since the resulting imine is favoured via a stable conjugated pi-bonding arrangement. This stabilisation does not extend to aminoalkyl-substituted aromatics in which the linking group is ethylene or longer chain alkylene, or indeed to conventional aliphatic amine or alkanolamine absorbents such as MEA. Such amines undergo the same initial loss of protonated amine to form aldehyde, but further degradation forms a wide variety of products including carboxylic acids, aldehydes and amino acids (C Gouedard, D Picq, F Launay, P-L Carrette; *Int. J. Greenh. Gas Con.*, 10,244 (2012)).

The inventors have recognised that the unique degradation properties of amines of Formula (I) can be exploited to regenerate liquid absorbent comprising these amines. Therefore, disclosed herein is a process for regenerating a liquid absorbent comprising at least one amine of Formula (I) and imine degradation product thereof comprising at least one imine of Formula (II):

 (I)

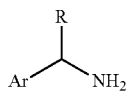

 (II)

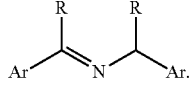

In the molecules of Formula (I) and Formula (II), each Ar is independently an aromatic group and each R is independently selected from hydrogen, an organyl group and $NH_2$. The process comprises contacting the liquid absorbent with a hydrophobic medium, and selectively extracting the degradation product into or through the hydrophobic medium.

The imine dimer degradation product is sufficiently non-polar to migrate preferentially into or through the hydrophobic medium, while the non-degraded amine absorbent is retained within the polar, and typically aqueous, liquid absorbent. Highly selective removal of the degradation product may thus be provided, with little accompanying loss of the non-degraded amine molecules. This approach to regeneration is not feasible for many other amine- and alkanolamine-based absorbents as the degradation products are themselves polar molecules which are preferentially soluble in the liquid absorbent.

The removal of the degradation product provides a regenerated liquid absorbent, which may then be recycled back to the gas capture process. Advantageously, such a regeneration process may be readily integrated into a gas capture facility. As a result of the removal of the degradation product, the amine absorbent concentration, and thus gas absorption capacity, of the absorbent solution in the process may be maintained at suitably high levels, for example via addition of make-up amine of Formula (I). Moreover, deleterious effects of the imine dimer on the physical properties of the absorbent solution, for example increased viscosity, may be mitigated.

As will be discussed in greater detail hereafter, the regeneration process may optionally further include converting the imine dimer degradation product back to the amine of Formula (I). At least a proportion of the degradation product may thereby be recovered and reused for gas absorption, which again is not feasible with many other amine absorbents.

Extraction with a Hydrophobic Medium

The hydrophobic medium may generally comprise any liquid or solid material which is substantially immiscible or insoluble in water, but which is capable of solubilising or absorbing an imine of Formula (II) such that it is extracted from the liquid absorbent.

In some embodiments, the hydrophobic medium is a hydrophobic liquid, and in particular an organic solvent. It should be appreciated that suitable organic solvents need not have zero capacity for dissolved water, but should be substantially immiscible with the liquid absorbent in that distinct phases are formed when contacted.

During the contact, the two phases may be well mixed to ensure transfer of the degradation product into the organic solvent phase. Subsequent phase separation then allows the organic phase to be separated from the regenerated liquid absorbent by liquid-liquid separation. The organic solvent may be contacted with and then separated from the liquid absorbent using conventional methods and equipment for liquid-liquid extractions including non-dispersive membrane contactors. The liquid-liquid extraction may be a batch process or a continuous process, and may include a single stage or optionally multiple stages to provide improved selectivity. The hydrophobic liquid and the liquid absorbent may be contacted in any suitable proportions, for example in a weight ratio of from 1:10 to 10:1, or from 1:5 to 5:1, or from 1:3 to 3:1, such as about 1:1. The hydrophobic liquid and the liquid absorbent may be contacted at any suitable temperature, but particularly temperatures below the boiling point of the hydrophobic liquid, for example 20° C. to 70° C., or 20° C. to 50° C. Optionally, the hydrophobic liquid and the liquid absorbent may be agitated or sheared to improve the contact and thus extraction of the imine of Formula (II).

The choice of the organic solvent is not considered particularly limited provided it is sufficiently hydrophobic that the imine degradation product preferentially partitions into it relative to the liquid absorbent. In some embodiments, the organic solvent is a non-polar solvent or a water-immiscible polar aprotic solvent. In some embodiments, the organic solvent is volatile, for example having a boiling point (at atmospheric pressure) of below 120° C., such as from 25° C. to 120° C., or below 100° C., or below 80° C. Higher volatility allows the organic solvent to be more easily separated by evaporation from solubilised components in downstream processing of the degradation product, and may also prevent build-up of the solvent in the working amine absorbent.

Suitable organic solvents may include aromatic hydrocarbons such as toluene, oxygen-containing solvents such as ethyl acetate and halogenated solvents such as dichloromethane (DCM). Such solvents may provide excellent phase separation behaviour when contacted with aqueous amine absorbents and highly selective extraction of the degradation product, yet also allow facile conversion of the dissolved imine dimer via a subsequent acid hydrolysis step, as will be discussed hereafter. Highly nonpolar solvents such as aliphatic hydrocarbons are also expected to be effective for extraction of the imine.

In some embodiments, the organic solvent comprises at least one selected from the group consisting of $C_2$-$C_6$ linear and branched alkyl esters of acetic acid or formic acid, $C_3$-$C_6$ linear or branched aliphatic ketones, halogenated methanes, halogenated ethanes, and aromatic hydrocarbons.

The use of hydrophobic organic solvents has been found to provide high selectivity for extraction of imine dimer degradation product, and is considered advantageous due to the ease of implementation. However, it is also envisaged that other hydrophobic media may be employed. In some embodiments, the liquid absorbent is contacted with a hydrophobic solid, such as polymer beads, and the relatively non-polar imine dimer degradation product is preferentially absorbed into the solid. This may be done, for example, in a packed absorption column through which the liquid absorbent is passed. Suitable hydrophobic solids may include porous hydrophobic polymer resins. A class of suitable hydrophobic solids is polyaromatic absorbent resin, for example a cross-linked styrene polymer such as a styrene-divinylbenzene co-polymer. Amberlite XAD-2 beads available from Sigma-Aldrich and Purosorb PAD500 available from Purolite are such materials. Another class of hydrophobic solids considered suitable is acrylic absorbent resins, for example an aliphatic methacrylate polymer. Purosorb PAD950 available from Purolite is such a material.

In a further embodiment, the liquid absorbent is contacted with a hydrophobic membrane which allows selective permeation of the imine dimer degradation product through the membrane while retaining amine absorbent and other polar species.

Liquid Absorbent

In some embodiments, the liquid absorbent is an aqueous composition. The aqueous liquid absorbent may comprise at least 10 wt % water, such as at least 20 wt % water.

In some embodiments, the liquid absorbent comprises the amine of Formula (I) in an amount of at least 10 wt %, such as 10 wt % to 80 wt %, 15 wt % to 80 wt %, 20 wt % to 80 wt % or 25 wt % to 80 wt % relative to the total weight of the composition.

In some embodiments, the liquid absorbent comprises a further absorbent for $CO_2$ in addition to the amine of Formula (I). The weight ratio of the amine of Formula (I) to the further absorbent may, for example, be from 99:1 to 1:99, or from 10:1 to 1:10, or from 5:1 to 1:5. In some embodiments the liquid absorbent comprises one or more additional $CO_2$-absorbing compounds selected from amines, alkanolamines, carbonate salts, amino acid salts and imidazoles. The one or more additional amines may be selected from primary, secondary and tertiary amines.

Examples of suitable additional $CO_2$-absorbing compounds include primary amines such as monoethanolamine, ethylenediamine, 2-amino-2-methyl-1-propanol, 2-amino-2-methyl-ethanolamine; secondary amines such as N-methylethanolamine, piperazine, piperidine and substituted piperidine, 3-piperidinemethanol, 3-piperidineethanol, 2-piperidinemethanol, 2-piperidineethanol, diethanolamine, diglycolamine and diisopropanolamine; tertiary amines such as N-methyldiethanolamine, N-piperidinemethanol, N-piperidineethanol, N, N-dimethylaminoethanol and 3-quinuclidinol; potassium carbonate; sodium glycinate, potassium taurate, sodium alaninate; imidazole and N-functionalised imidazoles such as those disclosed in U.S. Pat. No. 8,741,246 and amino acids such as taurine, sarcosine and alanine.

In some embodiments, the liquid absorbent comprises an additional base having a $pK_a$ greater than an amine of Formula (I) in the composition, for example at least 0.25 units higher. The additional high $pK_a$ base is preferably selected from tertiary amines, hindered amines, carbonate salts, amino acid salts and mixtures thereof, and most preferably from tertiary amines, hindered amines and mixtures thereof. We have found that formation of the imine dimer from the amine of Formula (I), and thus also the total rate of degradation, is inhibited in the presence of such bases. Without wishing to be bound by any theory, it is considered that the additional high $pK_a$ amine or other base is preferentially protonated by protons released when acid gas absorbs, and in particular the protons resulting from the rapid reaction of $CO_2$ with the amine of Formula (I) to form carbamate. The preferential uptake of these protons thus inhibits the initial step in the degradation process of the amine of Formula (I). Moreover, the favourable kinetics of the $CO_2$ absorption is not unacceptably compromised by the additional base since $CO_2$ still reacts directly with the amine of Formula (I) to form carbamate. The liquid absorbent may comprise the additional high $pK_a$ base in an amount of at least 10 wt %, such as at least 20 wt %. In some embodiments, the additional high $pK_a$ base and the amine of Formula (I) are present in similar molar amounts, such as from 2:1 to 1:2 mol/mol or about 1:1 mol/mol.

In the case of (aminomethyl)pyridines, the $pK_a$ of 2-(aminomethyl)pyridine, 3-(aminomethyl)pyridine and 4-(aminomethyl)pyridine at 25° C. is 8.6. It is preferred that the additional high $pK_a$ base, particularly a sterically hindered amine or tertiary amine, has a $pK_a$ of at least 8.85 such as a $pK_a$ of at least 9, a $pK_a$ of 8.85 to 11.5 or $pK_a$ of 9 to 11.5.

As used herein the term "sterically hindered amine" is defined as those compounds containing at least one primary or secondary amino group attached to either a secondary or tertiary carbon atom. In one embodiment the sterically hindered amine is a secondary amino group attached to either a secondary or tertiary carbon atom or a primary amino group attached to a tertiary carbon atom.

Examples of suitable sterically hindered amines, tertiary amines, carbonate salts and amino acid salts include those shown in the following table with the corresponding conjugate acid $pK_a$ at 25° C.

| Base | $pK_a$ at 25° C. |
|---|---|
| 2-amino-1-propanol | 9.5 |
| 2-amino-2-methyl-1-propanol | 9.7 |
| Piperidine | 11.1 |
| 2-piperidinylmethanol | 10.1 |
| 3-piperidinylmethanol | 10.4 |
| 4-piperidinylmethanol | 10.6 |
| 2-piperidinylethanol | 10.5 |
| 4-piperidinylethanol | 10.6 |
| 2-(dimethylamino)ethanol | 9.2 |
| potassium bicarbonate | 10.3 |
| sodium glycinate | 9.6 |
| potassium taurate | 9.1 |
| sodium alaninate | 9.7 |

Other suitable tertiary amines and sterically hindered amines of the required basicity will be readily apparent to those skilled in the art having regard to the above reference degradation mechanism and method of inhibition of imine formation.

In some embodiments, the liquid absorbent comprises:
the amine of Formula (I) in an amount of 10 wt % to 80 wt % such as 15 wt % to 80 wt %, 20 wt % to 80 wt % or 25 wt % to 80 wt % relative to the total weight of the solution;
optionally an additional amine selected from tertiary amines, hindered amines and mixtures thereof having a $pK_a$ greater than the amine of Formula (I) amine in an amount of up to 70 wt %, such as from 10 wt % to 70 wt %; and
water in an amount of at least 10 wt % such as from 10 wt % to 90 wt % or 20 wt % to 80 wt %.

In some embodiments, the liquid absorbent comprises one or more aliphatic amine absorbents. In some embodiments, the aliphatic amines are selected from unhindered primary or secondary amines and alkanolamines. Such amines, which include some of the most commonly used absorbents in $CO_2$ capture applications, are susceptible to oxidative degradation, forming an array of degradation products such as organic acids and other polar molecules. We have surprisingly found that the presence of a compound of Formula (I) in a liquid absorbent solution inhibits this degradation, even when included as only a minor component of the total amine. The compound of Formula (I) thus acts both as an effective co-absorbent in its own right but also as a sacrificial amine to inhibit the irreversible losses of the additional (and typically most abundant) aliphatic amine absorbent molecules. Advantageously, the liquid absorbent can then be regenerated as disclosed herein, thus removing the imine degradation product.

As used herein the term "unhindered primary or secondary amine" is defined as those compounds containing at least one primary or secondary amino group attached to primary carbon atom(s). The aliphatic amine may include, or consist of, monoethanolamine or diethanolamine. The aliphatic amine may be present as the main amine absorbent compound in the liquid composition, such as more than 50% of the total absorbent. For example, the molar ratio of aliphatic amines, preferably selected from an unhindered primary or secondary amine and an alkanolamine, to the combined total of the compounds of Formula (I) and Formula (II), may be greater than 2:1, or greater than 5:1, or greater than 10:1, or greater than 20:1, or greater than 50:1.

The liquid absorbent need not include ionic liquids or organic salts such as imidazolium cation or quaternary ammonium salts, and may be substantially free of such components. The composition may, if desired, include solvents in addition to water in order to modify solubility of the amine of Formula (I) and/or other absorbents which may be present. Examples of co-solvents may, for example, be selected from the group consisting of glycols, glycol derivatives selected from the group consisting of glycol ethers, glycol ether esters, glycol esters, long chain short chain aliphatic alcohols such as $C_1$ to $C_4$ alkanols, long chain aliphatic alcohols, long chain aromatic alcohols, amides, esters, ketones, phosphates, organic carbonates and organo sulfur compounds. Further components may be present such as solutes or other materials.

The liquid absorbent, prior to contact with the hydrophobic medium, may comprise imine of Formula (II) in an amount of above 1 wt %, or above 2 wt %. In the case of a cyclical absorption process such as post combustion $CO_2$ capture, the amount of degradation product in the liquid absorbent will typically be maintained at a steady state concentration which is determined by the rate of degradation, the rate at which absorbent is removed for regeneration and recycling, and the efficiency of the regeneration process (i.e. percentage imine removal). It will thus be appreciated that the preferred concentration range of imine of Formula (II) may be determined by balancing competing imperatives to minimise both the level of degradation product in the working absorbent and the size of the stream removed for regeneration. In practice, the steady state amount of imine of Formula (II) may be maintained below a level where operational problems are encountered (e.g. loss of mass transfer or foaming due to viscosity increase) and where the reduction in $CO_2$ absorption capacity due to loss of active amine of Formula (I) becomes unacceptable. Accordingly, the liquid absorbent, prior to contact with the hydrophobic medium, may comprise imine of Formula (II) in an amount of less than 10 wt %, or less than 5 wt %, or less than above 3 wt %, such as less than 2 wt %.

The liquid absorbent, after the contact with the hydrophobic medium, may still comprise imine of Formula (II), but at a lower concentration than before the contact. It will again be appreciated that the maximum technically achievable reduction in concentration may not be preferred in practice due to economic constraints. In some embodiments, the extraction reduces the amount of imine to less than 1 wt %, or less than 0.5 wt %, or less than 0.1 wt %, such as less than 0.05 wt % in the liquid absorbent.

The liquid absorbent, when contacted with the hydrophobic medium, may comprise an absorbed gas, for example $CO_2$. The concentration of absorbed $CO_2$ may be at least two times (and even more preferably at least five times) the equilibrium concentration obtained when the absorbent is exposed to air at below the boiling point of the aqueous solvent. In one embodiment the absorbed $CO_2$ constitutes at least 0.2% by weight, or at least 1%, or at least 10% by weight of the absorbent.

Amine of Formula (I) and Imine of Formula (II)

The liquid absorbent to be regenerated comprises at least one amine of Formula (I) and degradation product thereof comprising at least one imine of Formula (II). The composition may include only one amine molecule of Formula (I), and thus a single corresponding imine molecule of Formula (II). However, it is envisaged that a mixture of amine absorbent molecules may be used, for example a mixture of two or more aminomethylpyridine isomers. It will therefore be appreciated that the resulting degradation product may include multiple imine molecules, where the two Ar and two R groups can be the same or different as determined by the two originating molecules of Formula (I).

The R groups of the amine and imine molecules are selected from hydrogen, an organyl group and $NH_2$. In some embodiments, the R groups are selected from hydrogen, alkyl, cycloalkyl and aromatic groups, such as hydrogen, $C_1$ to $C_{10}$ alkyl, $C_1$ to $C_6$ cycloalkyl groups and monocyclic aromatic groups. In some embodiments, the R groups are hydrogen.

The Ar groups of the amine and imine molecules are selected from aromatic groups. In some embodiments, the Ar groups comprise a monocyclic aromatic group, in particular a six-membered monocyclic aromatic group, which is optionally substituted by one or more non-aromatic substituents such as $C_1$ to $C_{10}$ alkyl. In some embodiments, the monocyclic six-membered aromatic groups comprise 0, 1, 2 or 3 nitrogen ring atoms, with the other ring atoms being carbon. In some embodiments, the Ar groups are selected from 2-pyridyl, 3-pyridyl, 4-pyridyl and phenyl.

In some embodiments, the liquid absorbent comprises 2-aminomethylpyridine, 3-aminomethylpyridine, 4-aminomethylpyridine and/or benzylamine, and especially 3-aminomethylpyridine, as the amine of Formula (I).

Converting the Extracted Degradation Product

In some embodiments, the regeneration process comprises converting the extracted degradation product to form regenerated amine of Formula (I). The regenerated amine may then be recycled as make-up amine to the gas absorption process, thus reducing waste formation and overall amine consumption.

The conversion may comprise a step of hydrolysing the imine of Formula (II) to form one equivalent of regenerated amine of Formula (I) and one equivalent of aldehyde of Formula (III), according to the following representative scheme:

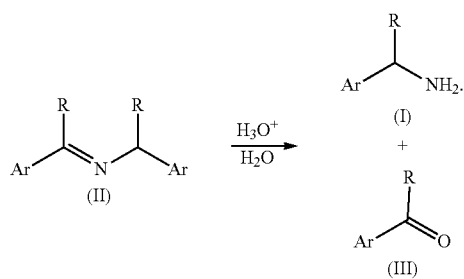

The imine of Formula (II) is found to be unstable in acidic aqueous conditions. For the case where the degradation product is extracted from the liquid absorbent into an organic solvent, hydrolysis may thus be achieved by contacting the separated organic phase with an acidified aqueous phase, for example containing a catalytic amount of acetic acid. After suitable mixing and time for hydrolysis, the two phases are separated by conventional liquid-liquid separation techniques, with the regenerated amine of Formula (I) partitioned into the aqueous phase and the less polar aldehyde of Formula (III) remaining in the organic phase.

The aqueous phase, now containing a first portion of regenerated amine of Formula (I), may then be recycled to the gas absorption process. It will be appreciated that a theoretical maximum of 50 mol % of the degraded amine may be recovered by this process step, since each molecule of imine incorporates two amine molecules.

Optionally, the aldehyde may then be reductively aminated to form a second amount of regenerated amine of Formula (I). Reductive amination of an aldehyde to amine can proceed via a number of different routes, generally requiring use of both a reducing agent and a source of nitrogen. In some embodiments, reductive amination is achieved by reacting the aldehyde with hydroxylamine to form an oxime, and then reducing the oxime to form the amine of Formula (I), as depicted in the following scheme:

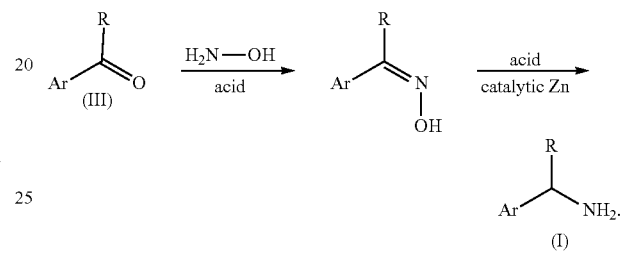

In other embodiments, reductive amination may be achieved using ammonia, $H_2$ and transition metal catalysts (for example as disclosed in *Organic Letters*, 2002, 4 (12), 2055-2058), or the use of ammonium formate (Leuckart reaction, as disclosed in *Journal of Organic Chemistry*, 1944, 9 (6), 529-536).

The regenerated amine produced by conversion of the aldehyde may then also be recycled to the gas absorption process. Theoretically, this allows substantially all the imine dimer degradation product to be recovered and recycled as amine, although it will be appreciated that the decision to implement one or both amine recovery steps (i.e. hydrolysis and reductive amination) in the regeneration process may be affected by the cost compared to that of fresh amine purchase.

Post Combustion $CO_2$ Capture

The regeneration process disclosed herein is considered particularly useful in $CO_2$ capture processes such as post combustion capture, and may optionally be integrated into such a process. Depicted in FIG. 1 is a schematic process flow diagram demonstrating one such embodiment. The process (100) includes an absorption reactor (102) for absorbing $CO_2$ from a flue gas stream, and a desorption (stripper) reactor (104) for desorbing $CO_2$. The absorption reactor (102) includes a first inlet (106), a second inlet (108), a first outlet (110), a second outlet (112), and one or more gas absorption contact regions (114). The first inlet (106) of the absorption reactor (102) is a flue gas inlet through which a $CO_2$ rich flue gas enters the absorption column (102). The total pressure of the $CO_2$ rich flue gas may vary widely depending on the application. The $CO_2$ partial pressure in the flue gas may be, for example, between 0.1 and 100 kPa. The second inlet (108) is an absorbent inlet through which a $CO_2$ lean aqueous absorbent comprising amine of Formula (I) and degradation product thereof comprising imine of Formula (II) (as hereinbefore described) enters the absorption column (102). The $CO_2$ rich flue gas and the $CO_2$ lean absorbent contact in the gas absorption contact regions (114). In these regions the $CO_2$ in the $CO_2$ rich flue gas is absorbed into the absorbent to form a $CO_2$ lean flue gas which exits the column (102) via the first outlet (110), and a $CO_2$ rich absorbent which exits via the second outlet (112). The $CO_2$ lean flue gas may still include some $CO_2$, but at a lower concentration than the $CO_2$ rich flue gas.

The absorbent may have a temperature of between 25° C. and 50° C. in absorption column (102), thus allowing a scope for a significant temperature increase during stripping and thus a high cyclic capacity. The local environment of the absorbent may be altered in the absorption column (102) to favour the absorption reaction, e.g. to increase absorption of $CO_2$ into solution. Such alterations of the local environment may include a change in pH, a change in temperature, a change in pressure etc. Alternatively, or additionally, the solution may include other compounds which assist in the absorption of $CO_2$. These compounds may alter the affinity or absorption capacity of amine absorbent molecules including those of Formula (I), or these compounds may also absorb $CO_2$. If additional compounds are added to the absorbent solution in the absorption reactor (102), the process may additionally include means to remove these compounds.

Desorption reactor (104) includes an inlet (118), a first outlet (120), a second outlet (122), and one or more gas desorption regions (124). The $CO_2$ rich absorbent exiting via the second outlet (112) of the absorption column (102) enters the desorption column (104) via the inlet (118). Desorption of $CO_2$ from the $CO_2$ rich absorbent then occurs in the gas desorption regions (124).

Desorption of $CO_2$ may involve the application of heat and/or a reduction in pressure to favour the desorption process. Furthermore, additional compounds may be added to the $CO_2$ rich solution to enhance the desorption process. Such compounds may alter the solution environment, for example by changing solution pH or altering another parameter to favour the desorption reaction.

Removal of $CO_2$ from the $CO_2$ rich absorbent results in the formation of a $CO_2$ rich gas stream and a $CO_2$ lean absorbent. The $CO_2$ lean absorbent may still include some $CO_2$, but at a lower concentration than the $CO_2$ rich absorbent that enters the desorption column (104). The $CO_2$ rich gas stream is taken off via the first outlet (120), which is a $CO_2$ outlet, and may subsequently be compressed, cooled and liquefied for injection into a geological formation (not shown). The $CO_2$ lean absorbent is taken off via the second outlet (122), and recycled to the absorption column (102) via its second inlet (108). The required temperature of the absorbent in the desorption column (104) is generally higher than in the absorption column (102), and the $CO_2$ lean and $CO_2$ rich streams cycling between the two columns may thus be thermally contacted in a heat exchanger (126) to improve the overall energy efficiency of the process.

The aqueous absorbent circulating between the two columns is typically exposed to high temperatures, particularly in the desorption column (104), and also to the presence of dioxygen ($O_2$) which enters with the flue gas. Accordingly, a portion of the amine of Formula (I) is converted to a degradation product comprising imine of Formula (II), as disclosed herein. Absent any intervention, the amount of imine will increase over time, reducing the cyclic $CO_2$ capacity of the aqueous absorbent and eventually also causing operation problems, such as foaming or loss of mass and heat transfer, due to increased viscosity of the absorbent solution.

The process (100) thus includes a regeneration section comprising a mixer (128) and a phase separation unit (130). A portion of the $CO_2$ rich absorbent exiting the absorption column (102) via the second outlet (112) is diverted to the regeneration unit as a regeneration stream (132), where it is contacted with an organic solvent (134) in the mixer (128). The organic solvent is hydrophobic and selected for its capacity to selectively extract the imine of Formula (II) from the aqueous absorbent, as disclosed herein. The mixer (128) provides sufficient turbulence and contact time to allow a high degree of imine extraction into the organic solvent. The mixed stream (136) exiting the mixer is then transferred to the phase separation unit (130), for example a continuously operated decanter, where the immiscible organic and aqueous phases are separated. The aqueous phase, being the $CO_2$ rich absorbent depleted of imine extracted into the organic phase, exits the separation unit as a regenerated stream (138). The regenerated stream (138) may contain residual imine, but at a lower concentration than in the regeneration stream (132). The regenerated stream is combined with the $CO_2$ lean absorbent exiting the desorption column (104) via its outlet (122), and thus re-joins the primary loop of absorbent solution circulating in the process. As depicted in FIG. 1, the aqueous phase is the lower density phase separating to an uppermost layer in the phase separation unit (130), as expected when organic solvents with specific gravity greater than water (such as dichloromethane) are used. However, it will be appreciated that the aqueous phase may instead be the higher density phase if an organic solvent with specific gravity lower than water (such as toluene) is used.

It is considered advantageous to withdraw $CO_2$ rich absorbent for regeneration, as the greater ionic strength induced by $CO_2$ absorption will increase the polarity difference between the phases and thus the effectiveness of imine extraction. Furthermore, the regenerated absorbent may preferably be added to the $CO_2$ lean solution exiting the desorption reactor (104). This avoids carryover of any residual organic solvent present in the regenerated absorbent into the $CO_2$ rich gas stream product. Rather, at least some of any residual organic solvent may be stripped out of the absorbent in the absorption column (102). However, it will be appreciated that absorbent for regeneration may in principle be withdrawn from, and returned to, any suitable locations on the primary loop.

It will also be appreciated that the required size of the regeneration stream (132), relative to the flow of absorbent circulating in the primary loop of the process, will depend on the expected rate of degradation and the level of degradation product that can be tolerated in the absorbent. By minimising the rate of degradation, the size of the stream diverted for regeneration can be reduced. Therefore, it is particularly preferred that the aqueous absorbent comprises, in addition to the amine of Formula (I), a further base such as tertiary or hindered amine having a $pK_a$ greater than an amine of Formula (I), as disclosed herein. The proportion of aqueous absorbent diverted for regeneration (per pass) may thus be small relative to the total circulating absorbent, such as less than 5%, or less than 2%, or less than 1%. Based on estimates of the degradation rate obtained in pilot-scale $CO_2$ absorption experiments, it is considered that the concentration of the imine of Formula (II) in the working absorbent may be maintained below 2 wt % by continuously regenerating about 0.1% of the absorbent circulating in the primary loop.

An imine-containing organic stream (140) exits the phase separation unit (130). Optionally, this stream is treated in an integrated reamination unit (142) to convert at least a portion of the contained imine of Formula (II) into amine of Formula (I). The amine thus recovered is then recycled via an amine return stream (144) to the primary absorbent loop. Alternatively, the imine-containing organic stream (140) may be processed to recover the organic solvent only, processed in batch mode (or off-site) to regenerate the amine, or discarded as waste.

If present, the integrated reamination unit (142) may comprise a hydrolysis unit in which the imine-containing organic stream (140) is contacted with an acidified aqueous phase. The imine is thus hydrolysed to form one equivalent of amine of Formula (I) and one equivalent of aldehyde of Formula (III), as disclosed herein. After phase separation, the aqueous phase now containing regenerated amine is returned, via amine return stream (144), to the primary absorbent loop. The aldehyde-containing organic phase may be further processed, on-site or off-site, in batch or continuous mode, to convert the aldehyde to amine of Formula (I) by reductive amination and/or to recover the organic solvent, or discarded as waste.

In an aspect of the invention there is provided a process for removing $CO_2$ gas from a gas mixture including: i) circulating a liquid absorbent comprising at least one amine of Formula (I) between a $CO_2$ absorption step and a $CO_2$ desorption step, wherein: (a) the absorption step comprises contacting a gas mixture comprising $CO_2$ with a $CO_2$ lean form of the liquid absorbent to form a $CO_2$ rich form of the liquid absorbent and a gas mixture lean in $CO_2$, (b) the desorption step comprises desorbing $CO_2$ from the $CO_2$ rich form of the liquid absorbent to form the $CO_2$ lean form of the liquid absorbent and a gas mixture rich in $CO_2$, and (c) the at least one amine of Formula (I) degrades such that the liquid absorbent comprises the at least one amine of Formula (I) and degradation product thereof comprising at least one imine of Formula (II); and ii) regenerating the liquid absorbent according to any of the embodiments disclosed herein.

Other Applications

It is envisaged that the selective degradation chemistry of the amines of Formula (I) may also be applied in processes for absorbing gases other than $CO_2$, for example other acid gases such as $H_2S$ or $SO_x$. Such gases could be absorbed together with $CO_2$ or from $CO_2$ free gas streams.

In one set of embodiments, the amine of Formula (I) is used to scavenge dioxygen. Thus, amine of Formula (I) is added to a liquid composition in an amount sufficient to react with unwanted dioxygen entering the composition, thereby preventing or inhibiting other undesirable oxidation reactions in the liquid composition. Once the liquid composition comprises an elevated level of imine of Formula (II), the composition may be regenerated by the methods disclosed herein. The liquid composition to which the amine of Formula (I) is added may be an amine-containing absorbent for $CO_2$ capture applications, including conventional absorbents such as monoethanolamine-based absorbents (e.g. 30% MEA).

EXAMPLES

The present invention is described with reference to the following examples. It is to be understood that the examples are illustrative of and not limiting to the invention described herein.

The chemical abbreviations used in the specification have the following meaning:
AMPy: (aminomethyl)pyridine
2-AMPy: 2-(aminomethyl)pyridine
3-AMPy: 3-(aminomethyl)pyridine
4-AMPy: 4-(aminomethyl)pyridine
MEA: monoethanolamine
AMP: 2-amino-2-methyl-1-propanol Example 1: Pilot Plant Trials Using Aqueous Absorbent Containing 6 mol/L 3-AMPy Extended pilot plant trials have been undertaken using a 0.4 tonne/day $CO_2$ capture plant located at a brown coal power station, configured with absorption column (102), desorption column (104) and heat exchanger (126) substantially as depicted in FIG. 1. The capture plant was operated with a flue gas slip-stream of flow rate 80 m³/hr directly taken from the power station.

A campaign with 6 mol/L aqueous 3-AMPy (61 wt % 3-AMPy and 39 wt % water) was operated for a duration of approximately 1500 hours (63 days). During operation the performance of the plant was assessed in terms of reboiler energy requirement and the degradation of the amine was monitored. The single dominant degradation product formed was also identified and characterised. Minimum reboiler duties of 2.9 and 2.6 GJ/tonne $CO_2$ without and with use of the cold rich split process configuration respectively were achieved. This is compared to 3.4 GJ/tonne $CO_2$ for 5 mol/L monoethanolamine (MEA) in both configurations. In the cold rich split configuration, a portion of the $CO_2$-rich absorbent leaving the absorption column (102) bypassed heat exchanger (126) and entered the desorption column (104) at a level higher than the inlet for the heated portion of the $CO_2$-rich absorbent. This knocks down water and amine vapour and reduces the condenser duty on the desorption column.

In laboratory testing under accelerated degradation conditions the dominant degradation product formed was found to be an imine dimer of 3-AMPy. Monitoring of loss of amine and formation of the imine was undertaken during the campaign by infrared (IR) spectroscopy and high performance liquid chromatography (HPLC). Additional analysis of plant samples by ¹³C and ¹H-NMR spectroscopy confirmed that the previously identified imine was the primary degradation product in the plant.

Figure 2:
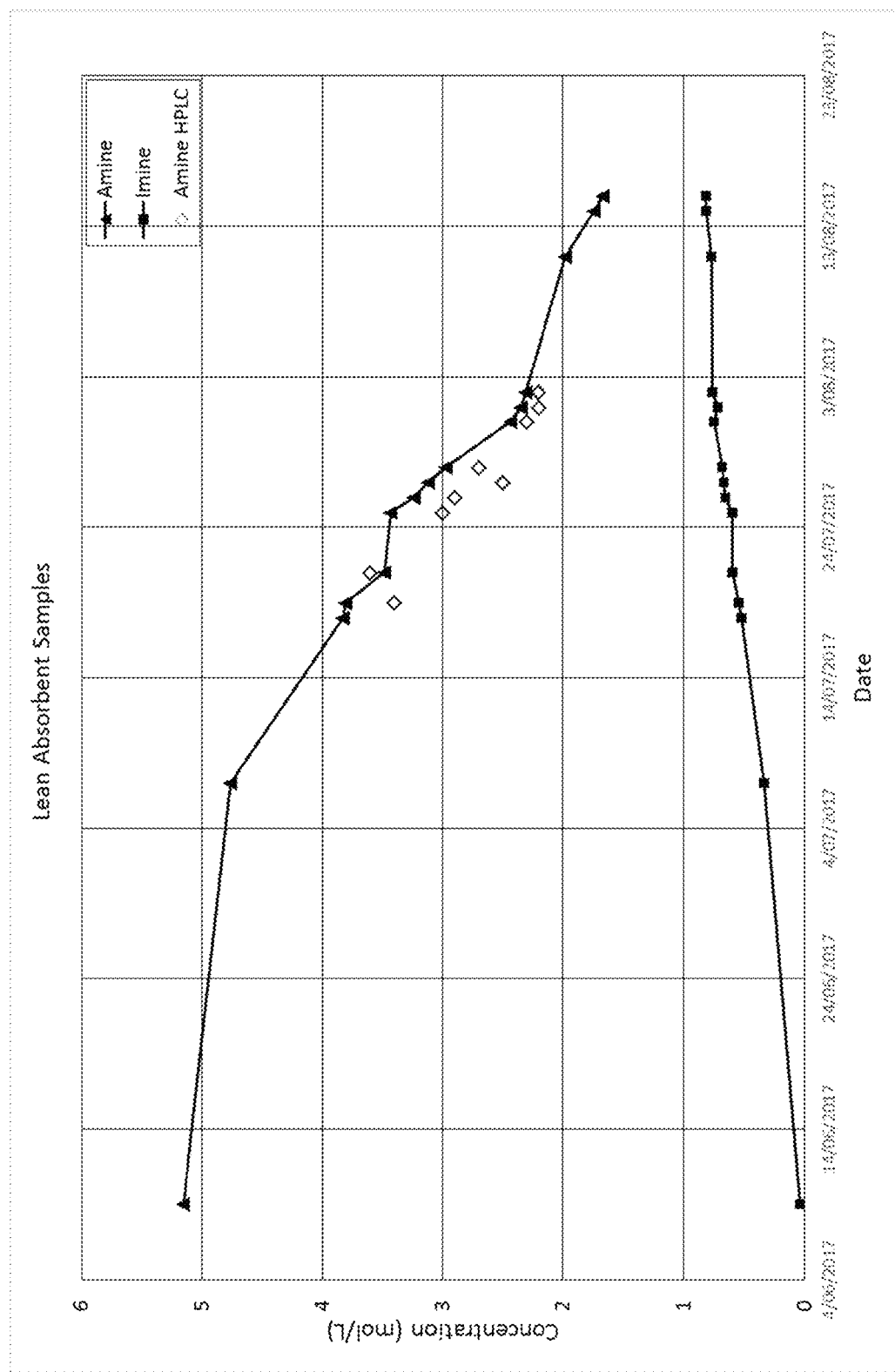
FIG. 2 is a graph showing the concentrations of 3-AMPy, and imine dimer formed by degradation of 3-AMPy, as determined by IR spectroscopy (solid points) and HPLC (circles) over 1500 hours of CO₂ capture in a pilot plant with aqueous absorbent initially containing 6M 3-AMPy.

FIG. 2 is a plot of the trend in amine and imine concentration during the pilot plant campaign.

During the pilot plant trial the degradation reaction mechanism was investigated in the laboratory by breaking the overall reaction down into the possible individual chemical transformations and testing if they occurred. The determined mechanism proceeds via a protonated 3-AMPy molecule and loss of an ammonium ion followed by oxidation. The complete degradation mechanism of 3-AMPy to an imine via reaction with oxygen is shown in the following Scheme.

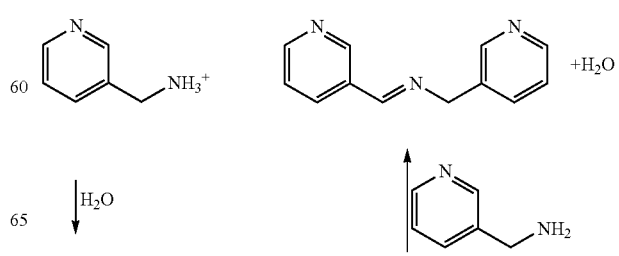

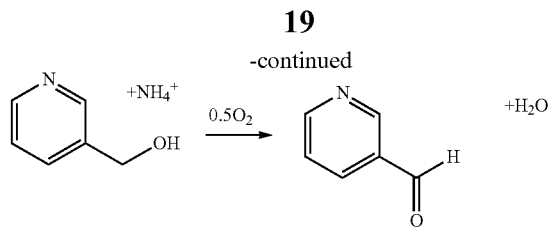

Example 2. Pilot Plant Trials Using Aqueous Absorbent Containing 3 mol/L 3-AMPy and 3 mol/L AMP Based on the degradation mechanism of the above scheme it was considered that if 3-AMPy was formulated with a stronger base to reduce the formation of protonated 3-AMPy during $CO_2$ absorption, its degradation could be suppressed. 2-Amino-2-methyl-1-propanol (AMP) was chosen as the amine for formulation as it has the required basicity and is known to be robust in $CO_2$ capture applications. AMP does not react directly with $CO_2$ but rather acts as a base to preferentially accept the protons released when 3-AMPy reacts. Simulations indicated that the concentrations used in the absorbent of aqueous 3 mol/L 3-AMPy and 3 mol/L AMP were optimal to reduce degradation and maintain capture performance.

Figure 3:
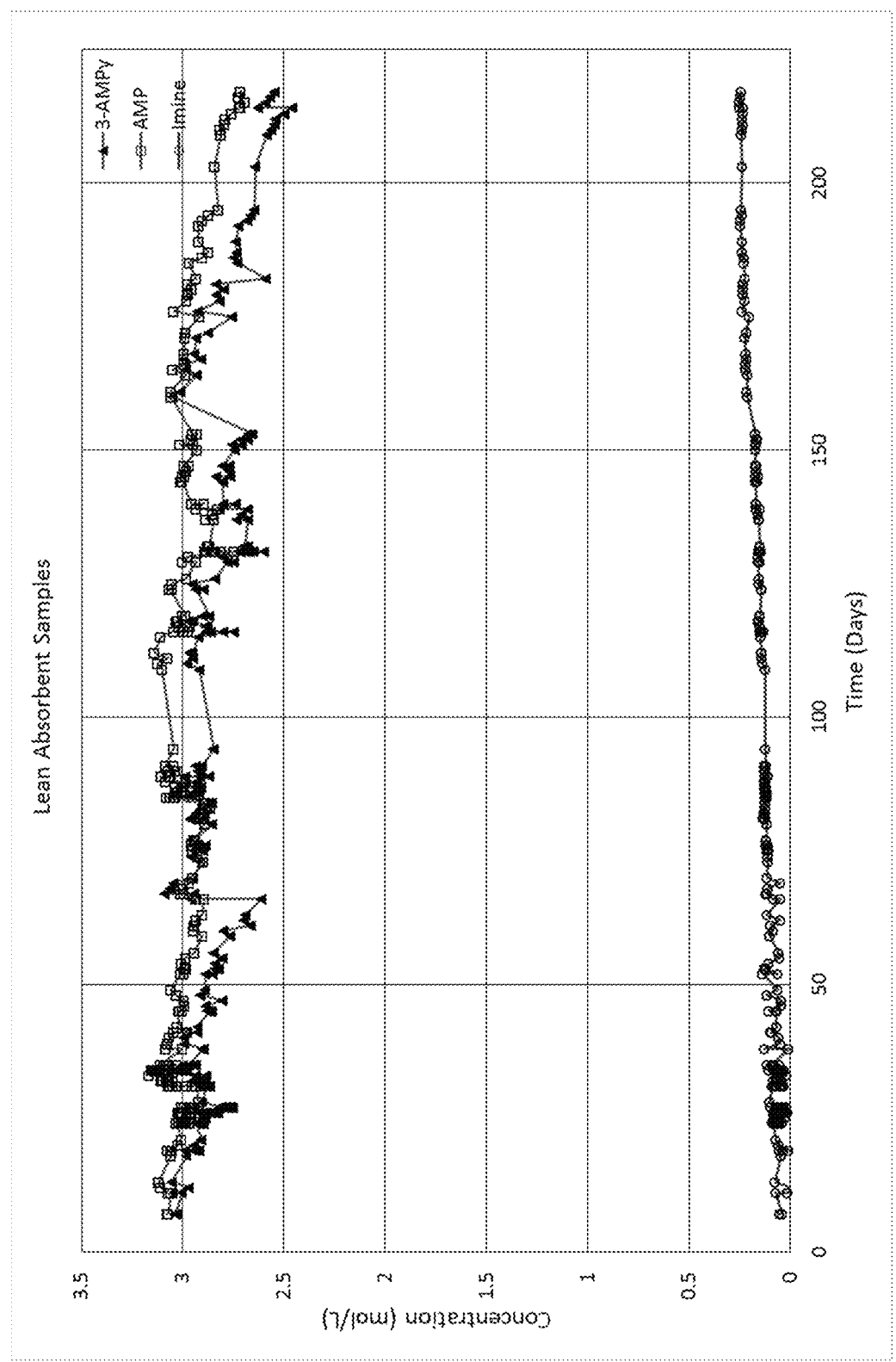
FIG. 3 is a graph showing the concentrations of 3-AMPy, AMP, and imine dimer formed by degradation of 3-AMPy, over 200+ days of pilot plant CO₂ capture with aqueous absorbent initially containing 3M 3-AMPy and 3M AMP.

A pilot plant campaign was conducted with aqueous absorbent containing 3 mol/L 3-AMPy and 3 mol/L AMP (32 wt % 3-AMPy, 26 wt % AMP and 42 wt % water) for 5000 hours. It was possible to conduct a much longer campaign as the degradation of the absorbent was much slower than the absorbent of Example 1. The same reboiler energy requirements were achieved as in Example 1. FIG. 3 shows the concentrations of 3-AMPy, AMP and imine over the duration of the campaign. The rate of imine formation was orders of magnitude lower than seen in the trial of Example 1. In addition the overall rate of degradation was found to be 10 times slower than expected for 5 mol/L MEA (see Example 3).

The formation of the imine dimer, and the inhibition of degradation by use of a more basic amine co-absorbent that this allows, is a unique property of amino(C1)aromatic systems and in particular aminomethyl substituted heteroaromatics. (Aminoalkyl)pyridine with longer bridging chains such as ethyl and propyl between the amino and pyridine group do not form the imine and degrade via chain loss and more traditional mechanisms that form products that cannot easily be recovered or regenerated to the initial amine.

Example 3. Comparison of the Absorbent of Examples 1 and 2 with MEA

The pilot plant was also operated with 5 mol/L (30 wt %) aqueous monoethanolamine (MEA) for approximately 500 hours. This allowed optimum reboiler duties to be identified for each absorbent via parametric study. These optimum reboiler duties and rates of amine degradation are shown in the table below and are for the standard plant configuration (no rich split). Note that the MEA degradation information is taken from literature as it was only run for a short duration in the pilot plant.

|  | 5 mol/L MEA | Example 1 | Example 2 |
| --- | --- | --- | --- |
| Reboiler duty (GJ/tonne $CO_2$) | 3.4 | 2.9 | 2.9 |
| Amine degradation rate (kg/tonne $CO_2$) | 1.5* | 23 | 0.16 |

*Degradation rate taken from book P. Feron, Absorption-Based Post-Combustion Capture of Carbon Dioxide, Elsevier (2016).

Oxidative degradation of monoethanolamine is known to produce organic acids (e.g. formic and oxalic acid) and a wide variety of other products, many of which are highly soluble in the aqueous absorbent solution. The degradation products are thus not readily recoverable or regenerable to form monoethanolamine.

Example 4. Other Bases to Inhibit Degradation of (aminomethyl)pyridines

As shown in Example 2, the presence of AMP in the absorber composition inhibited the formation of the imine produced by dimerization of the AMPy derivative formed on absorption of $CO_2$. Other bases including amines of higher conjugate acid $pK_a$ than the (aminomethyl)pyridine may also be used in this role. Preferred bases are tertiary and sterically hindered amines which are stable and provide a proton accepting role on $CO_2$ absorption. The average $pK_a$ of 2-(aminomethyl)pyridine, 3-(aminomethyl)pyridine and 4-(aminomethyl)pyridine at 25° C. is 8.6

Suitable bases typically have a $pK_a$ at least 0.25 units higher than the $pK_a$ of the (aminomethyl)pyridines, that is about 0.25 units higher than 8.6 (this represents a 2.5× increased selectivity for protons). Examples of suitable tertiary and sterically hindered amines, carbonate salts and amino acid salts include those specified in the table below together with the $pK_a$ of the conjugate acid at 25° C.

| Base | $pK_a$ at 25° C. |
| --- | --- |
| 2-amino-1-propanol | 9.5 |
| 2-amino-2-methyl-1-propanol | 9.7 |
| Piperidine | 11.1 |
| 2-piperidinylmethanol | 10.1 |
| 3-piperidinylmethanol | 10.4 |
| 4-piperidinylmethanol | 10.6 |
| 2-piperidinylethanol | 10.5 |
| 4-piperidinylethanol | 10.6 |
| 2-(dimethylamino)ethanol | 9.2 |
| potassium bicarbonate | 10.3 |
| sodium glycinate | 9.6 |
| potassium taurate | 9.1 |
| sodium alaninate | 9.7 |

Example 5. Extraction of Imine Dimer Into Organic Solvents

A sample of the aqueous absorbent, which had initially contained 3 mol/L 3-AMPy and 3 mol/L 2-amino-2-methyl-1-propanol (AMP), was taken after 3800 hours (c.a. 158 days) of operation in the pilot plant campaign described in Example 2. Despite the improved stability of the solution as a result of the AMP, it is evident from FIG. 3 that imine dimer degradation product was present in significant quantities (c.a. 0.2 mol/litre) by this time.

Figure 4:
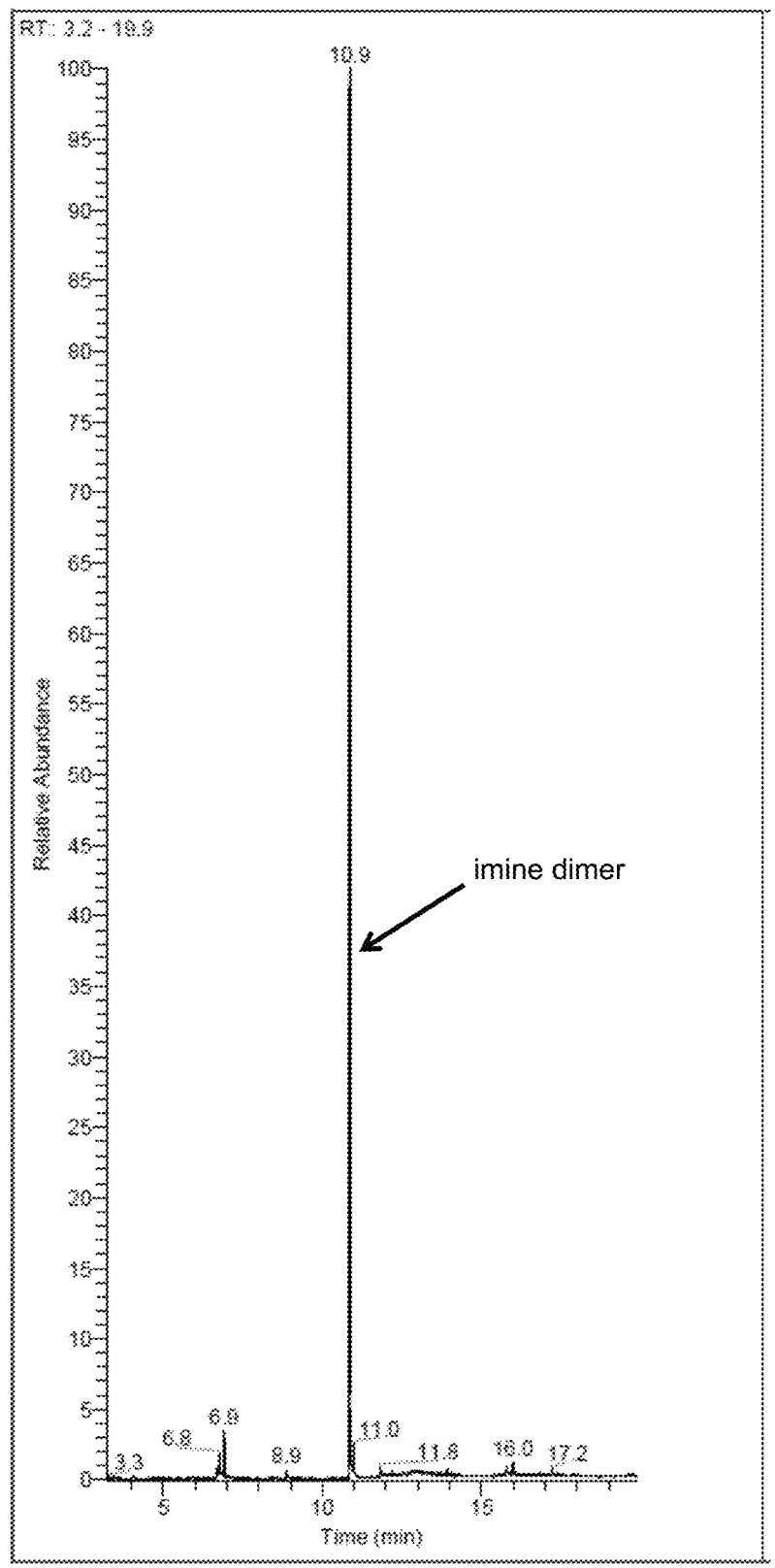
FIG. 4 is a GC-MS chromatogram of the organic phase obtained after extracting a sample of aqueous absorbent, initially containing 3M 3-AMPy and 3M AMP and used in pilot plant CO₂ capture for 158 days, with dichloromethane.
Figure 5:
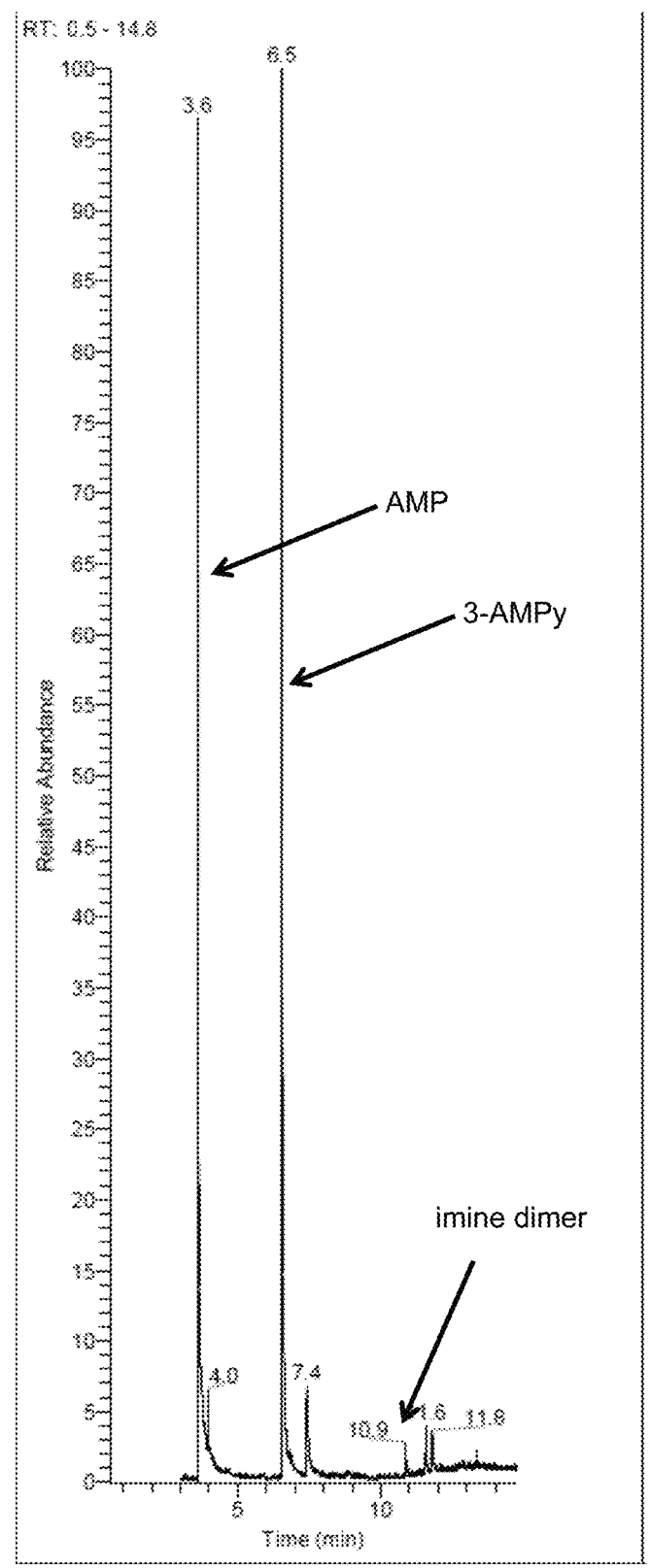
FIG. 5 is a GC-MS chromatogram of the aqueous phase remaining after extracting a sample of aqueous absorbent, initially containing 3M 3-AMPy and 3M AMP and used in pilot plant CO₂ capture for 158 days, with dichloromethane.

Equal volumes of the sample and dichloromethane were vigorously shaken in a separating funnel and allowed to undergo phase separation. The two phases were then collected and separately analysed by GC-MS. FIGS. 4 and 5 depict gas chromatographs of the organic and aqueous phases respectively, with the peaks identified by mass spectrometry via comparison against libraries of reference spectra. It was found that the imine degradation product was almost exclusively present in the organic phase, while the amine absorbents remained almost exclusively in the aqueous phase.

Samples of the same aqueous absorbent were also extracted with equal volumes of toluene or ethyl acetate. The organic phases after extraction with dichloromethane, toluene and ethyl acetate were analysed by $^{13}C$ NMR. In all three cases, the spectra confirmed the successful and selective extraction of the imine dimer into the organic phase.

Example 6. Effect of Regeneration on Viscosity

Another sample of the aqueous absorbent, which had initially contained 3 mol/L 3-AMPy and 3 mol/L 2-amino-2-methyl-1-propanol (AMP) and was taken after c.a. 5000 hours (c.a. 208 days) of operation in the pilot plant campaign described in Example 2, was extracted with dichloromethane as described in Example 5. As a result of the extraction, the viscosity of the sample was reduced from 9.9 mPa·s to 6.0 mPa·s (measured at 40° C. using an Anton Parr LOVIS 2000 ME instrument). By comparison, the viscosity of the fresh, $CO_2$ free absorbent was 4.7 mPa·s. The effect of the viscosity reduction is to improve the performance of the absorbent in the plant through better flow properties and reduced mass transfer resistance.

To confirm the impact of the imine degradation product on viscosity the imine was artificially synthesised and isolated according to the scheme shown below.

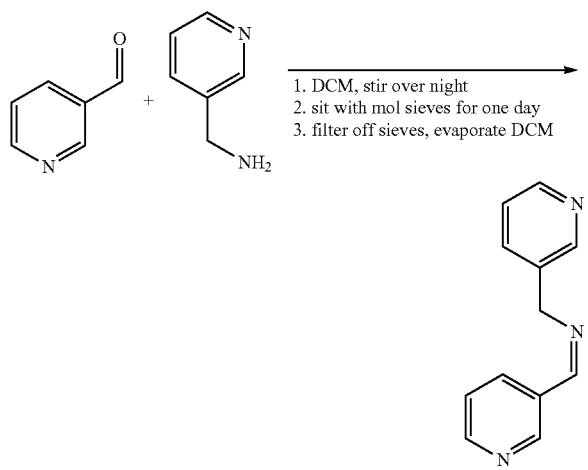

The synthesised imine (structure confirmed by IR spectroscopy) was added to fresh absorbent and the impact on viscosity measured (measured at 40° C. using an Anton Parr LOVIS 2000 ME). The viscosity of the solution increased with the concentration of synthetic imine added.

Example 7. Regeneration of 3-AMPy from the Imine Degradation Product

A sample of the aqueous absorbent, which had initially contained 3 mol/L 3-AMPy and 3 mol/L 2-amino-2-methyl-1-propanol (AMP) and was taken after c.a. 3800 hours (c.a. 158 days) of operation in the pilot plant campaign described in Example 2. The sample was shaken with an equal volume of dichloromethane (DCM) in a separating funnel for 1 minute. The phases were then allowed to separate and each phase was collected separately. The imine degradation product, now in the DCM, was converted to 3-AMPy by a two-step procedure, which successively provided a first equivalent and a second equivalent of 3-AMPy per mole of the imine. In the first step, two equivalents of acetic acid and excess water was added to the DCM solution of imine dimer, and vigorously stirred at room temperature for 24 hours. The imine dimer is unstable under acidic aqueous conditions, and was thus hydrolysed to form molecules of 3-AMPy and aldehyde according to the following scheme.

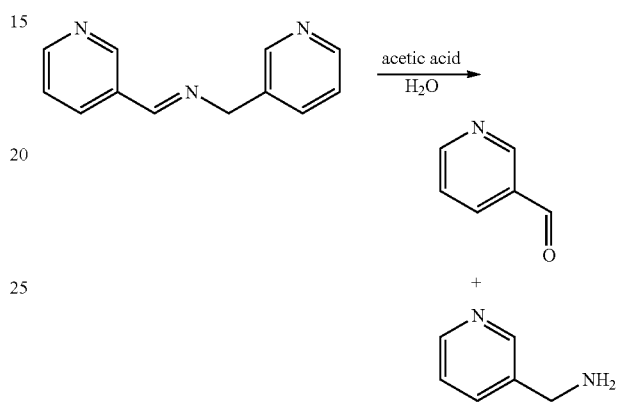

The resulting water/DCM mixture was placed in a separating funnel, and following phase separation the water and DCM phases were collected separately. The 3-AMPy remained in the aqueous phase and the aldehyde in the DCM phase. The aldehyde was then converted to a further portion of 3-AMPy by stirring the DCM/aldehyde solution for 2 hours at room temperature with hydroxylamine and hydrochloric acid (HCl) in ethanol to form an oxime. A small amount of zinc (Zn) dust was then added and stirring continued for 2 hours subsequently reducing the oxime to the amine. The reaction proceeds according to the following scheme. The Zn dust was then removed by filtration and DCM and ethanol by rotary evaporation. The formation of pure 3-AMPy was confirmed by $^1H$-NMR.

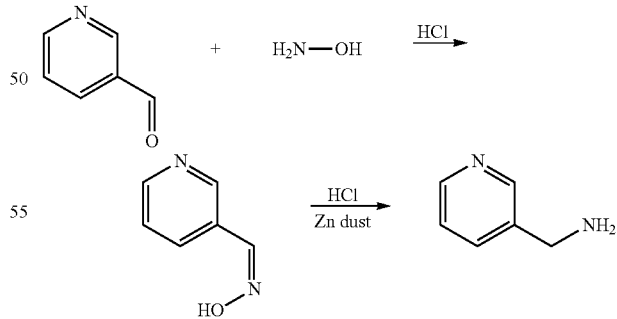

Example 8. Oxidative Degradation of Benzylamine

Figure 6:
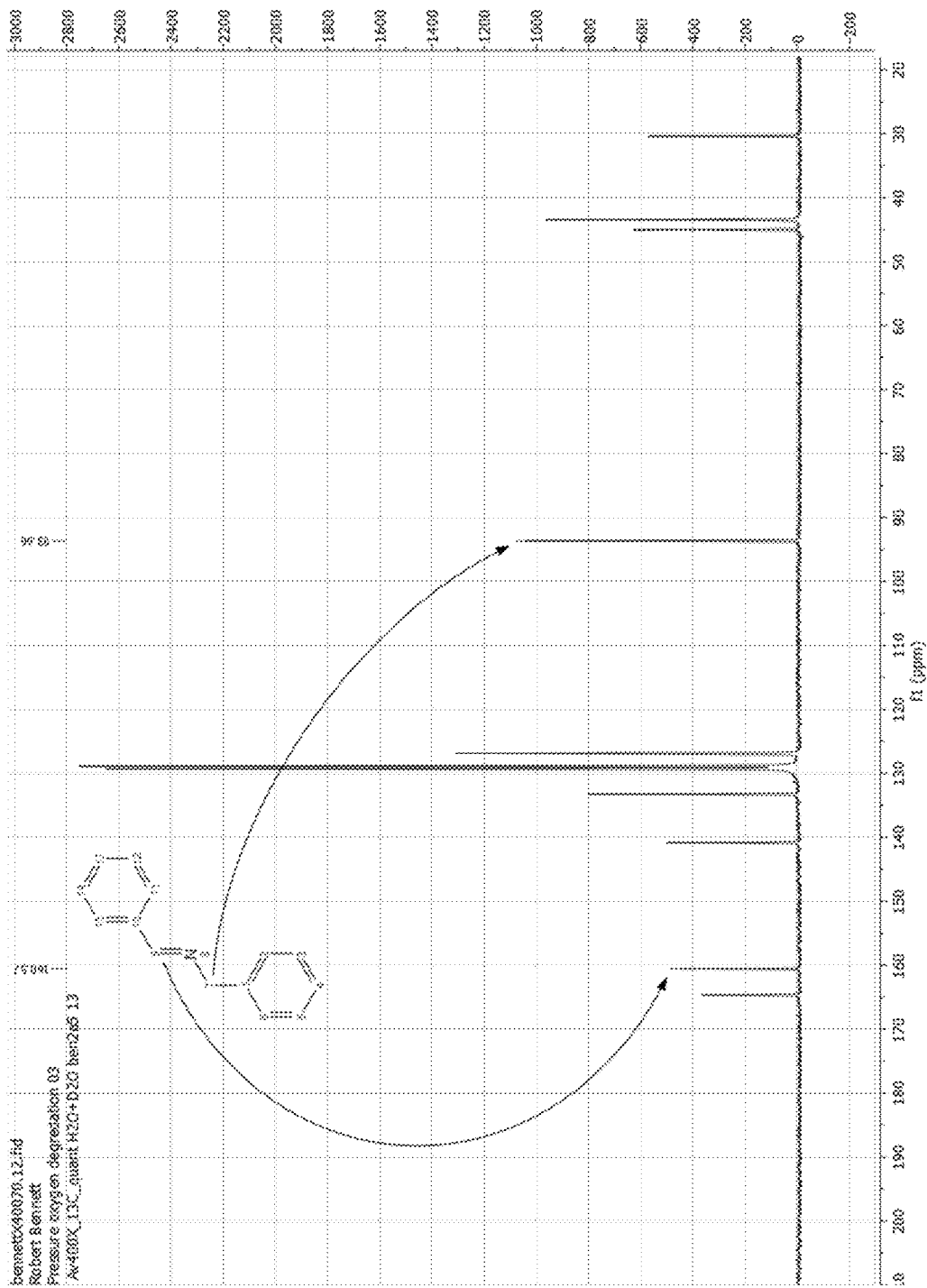
FIG. 6 is a ¹³C-NMR spectrum of an aqueous solution of benzylamine exposed to an atmosphere of CO₂ and O₂ for 10 days at 55° C.

The oxidative degradation of benzylamine (BZA), another amine of Formula (I), was investigated using accelerated degradation conditions designed to simulate longer-term degradation in a gas capture process. A solution of 10 mL of 1 mol/L BZA was placed in a Fischer-Porter vessel. The vessel was sealed and the remaining headspace of the vessel was filled with $CO_2$ (1 bar) and $O_2$ (9 bar). The liquid phase in the vessel was stirred via a magnetic stirring bar and heated to 55° C. by immersion in a water bath for 10 days. A sample was then taken and analysed by $^{13}$C-NMR spectroscopy (Bruker Avance 400). The resulting spectrum, depicted in FIG. 6, clearly showed the formation of a considerable amount of the corresponding imine of Formula (II) from the characteristic C═N peak at 160.57 ppm and N-C peak at 93.66 ppm. Based on relative peak areas approximately 41% of the BZA had been converted to imine.

Example 9. Extraction of Imine Dimer by Solid Absorption

A sample of the aqueous absorbent, which had initially contained 3 mol/L 3-AMPy and 3 mol/L 2-amino-2-methyl-1-propanol (AMP), was taken after 5000 hours (c.a. 208 days) of operation in the pilot plant campaign described in Example 2. Despite the improved stability of the solution as a result of the AMP, imine dimer degradation product was present in significant quantities (c.a. 0.35 mol/litre) by this time.

Amberlite XAD-2, a hydrophobic crosslinked polystyrene copolymer resin, was washed 3 times in deionized water followed by washing 3 times in dichloromethane (DCM). The cleaned beads were mixed with the absorbent sample that had been exposed to 5000 hours of flue gas. The mixture was stirred for 2 hours to allow the hydrophobic components to adhere to the polymer resin. The mixture was filtered to remove the water soluble portion of the degraded amine absorbent. The beads were washed with water and this water added to the filtrate. The beads were then washed with 3 portions of DCM, and the collected DCM was partially evaporated.

Figure 7:
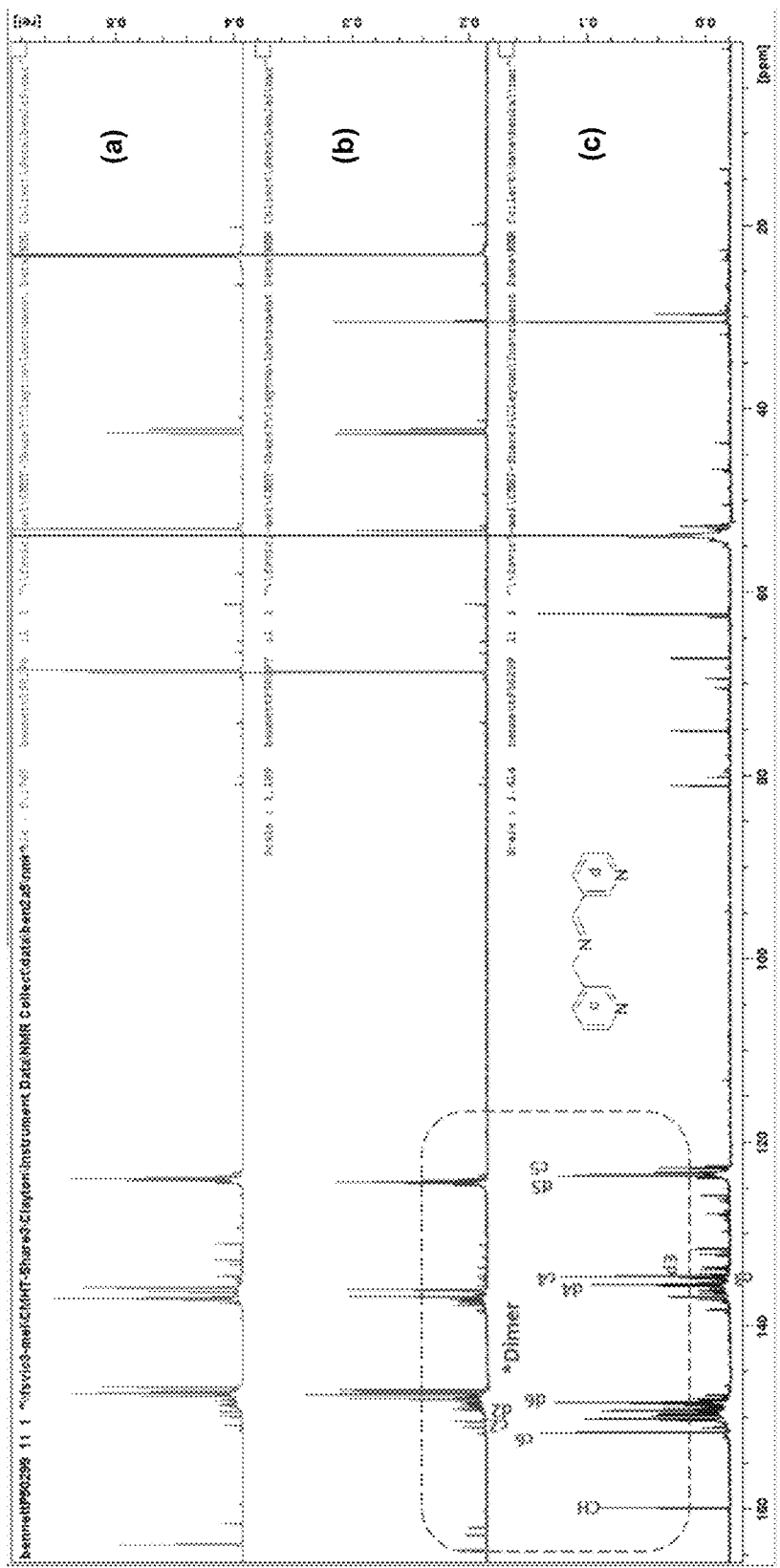
FIG. 7 depicts ¹³C-NMR spectra of the components of an aqueous absorbent, initially containing 3 mol/L 3-AMPy and 3 mol/L 2-amino-2-methyl-1-propanol (AMP) and used in pilot plant CO₂ capture for 208 days, (a) before absorption with Amberlite XAD-2 beads, (b) after absorption with the beads, and (c) of the components extracted from the absorbent by the beads.

FIG. 7 shows $^{13}$C NMR spectra of (a) the sample before contact with Amberlite, (b) the aqueous filtrate and (c) the DCM wash residue. The characteristic imine peak near 160 ppm is clearly present in the DCM wash and substantially absent in the aqueous filtrate, indicating that a majority of the imine was extracted by the Amberlite. Very little amine was extracted into the beads and carried over to the DCM wash, as evidenced by the lack of peaks near 42 ppm (these peaks are present in the sample and aqueous filtrate spectra). With the washing of the adsorbed imine from the Amberlite into DCM, it can then be further processed in the same manner as imine extracted by liquid-liquid extraction.

Example 10. BZA and 3-AMPy as a Sacrifical Oxygen Scavenger

Diethanolamine (DEA) is a low cost alkanolamine used industrially for $CO_2$ separation applications, which is known to degrade in the presence of $O_2$. The effect of 3-aminomethylpyridine (3-AMPy) and benzylamine (BZA) on the degradation of DEA was investigated using accelerated degradation conditions designed to simulate longer-term degradation in a gas capture process. DEA solutions were thus prepared as follows: i) 6 mol/L DEA; ii) 5.9 mol/L DEA and 0.1 mol/L BZA; and iii) 5.9 mol/L DEA and 0.1 mol/L 3-AMPy. Each solution (10 ml) was placed in a Fischer-Porter vessel. The vessels were sealed and the remaining headspace of the vessels was filled with $CO_2$ (1 bar) and $O_2$ (9 bar). The liquid phase in the vessels was stirred via magnetic stirring bars and heated to 55° C. by immersion in a water bath for 115 hours.

Figure 8:
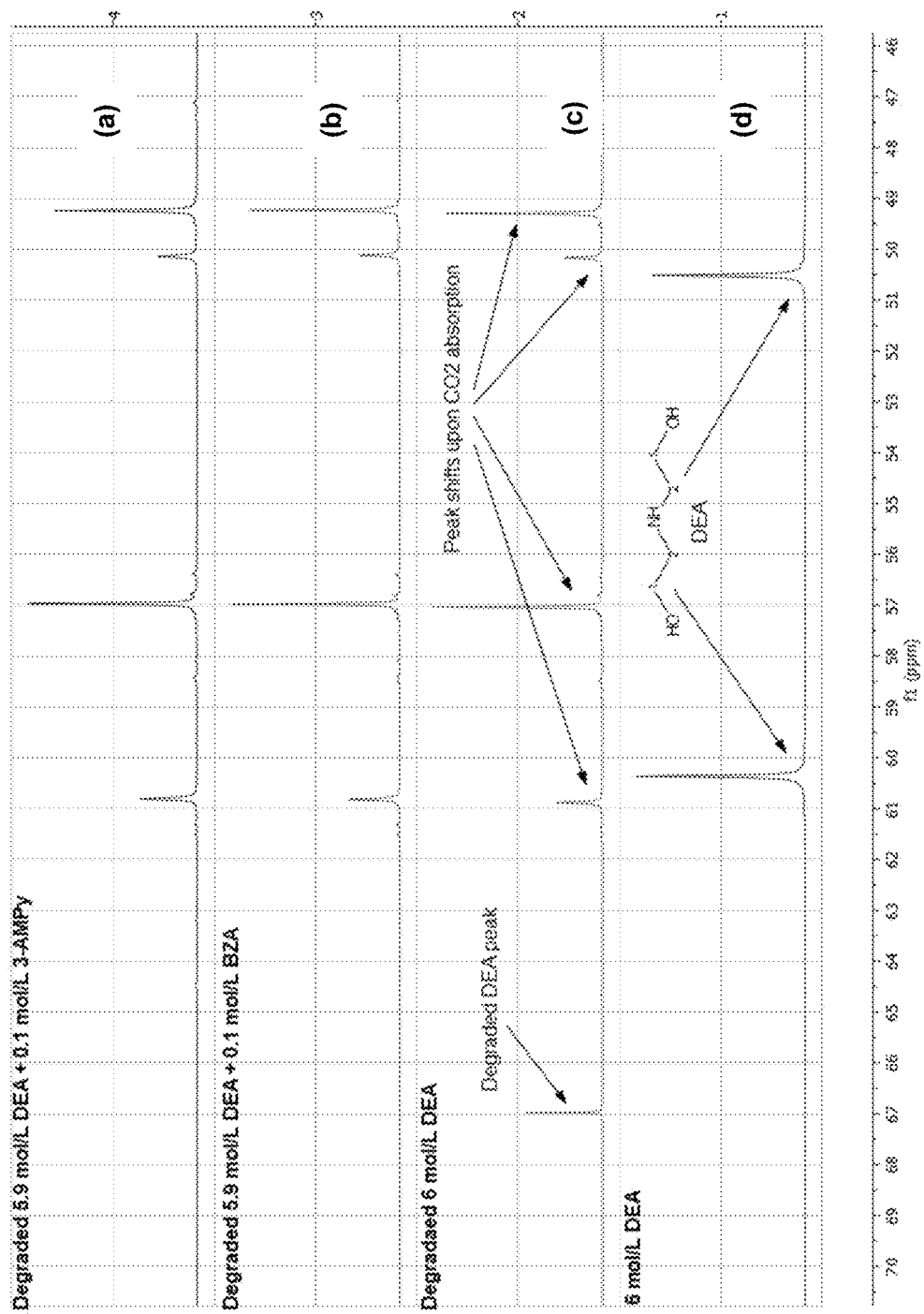
FIG. 8 depicts ¹³C-NMR spectrum of (d) a fresh absorbent solution of diethanolamine, (c) the absorbent solution of diethanolamine after exposure to an atmosphere of CO₂ and O₂ for 115 hours at 55° C., (b) an absorbent solution of diethanolamine and benzylamine after exposure to an atmosphere of CO₂ and O₂ for 115 hours at 55° C., and (a) an absorbent solution of diethanolamine and 3-aminomethylpyridine after exposure to an atmosphere of CO₂ and O₂ for 115 hours at 55° C.

Samples were then taken and analysed by $^{13}$C-NMR spectroscopy (Bruker Avance 400). The resulting spectra are depicted in FIG. 8. The spectra clearly show the formation of a considerable amount of DEA degradation (peak at 67 ppm) for the DEA only solution (FIG. 8*c*) compared to the undegraded solution (FIG. 8*d*). For the solutions containing small amounts of BZA or 3-AMPy this degradation has not occurred (FIGS. 8*b* and 8*a* respectively). The lack of DEA degradation in the presence of 0.1 mol/L BZA or 0.1 mol/L 3-AMPy demonstrates that these amines have selectively degraded thus preventing degradation of DEA.

Those skilled in the art will appreciate that the invention described herein is susceptible to variations and modifications other than those specifically described. It is understood that the invention includes all such variations and modifications which fall within the spirit and scope of the present invention.

Future patent applications may be filed in Australia or overseas on the basis of or claiming priority from the present application. It is to be understood that the following provisional claims are provided by way of example only, and are not intended to limit the scope of what may be claimed in any such future application. Features may be added to or omitted from the provisional claims at a later date so as to further define or re-define the invention or inventions.

The invention claimed is:

1. A method for absorbing an acid gas from a gas stream containing the acid gas and dioxygen ($O_2$), the method comprising contacting the gas stream with a liquid absorbent comprising:

i) at least one amine of Formula (I):

and ii) at least one aliphatic amine, wherein the compound of Formula (I) is selectively degraded by the $O_2$ to form a degradation product comprising at least one imine of Formula (II):

wherein, in the amine of Formula (I) and the imine of Formula (II), each Ar is independently an aromatic group and each R is independently selected from hydrogen, an organyl group and $NH_2$, wherein the selective degradation of the compound of Formula (I) inhibits degradation of the at least one aliphatic amine.

2. A method according to claim 1, wherein the aliphatic amine is selected from unhindered primary or secondary amines and alkanolamines.

3. A method according to claim 1, wherein the aliphatic amine is selected from monoethanolamine and diethanolamine.

4. A method according to claim 1, wherein a molar ratio of the aliphatic amine to the combined total of the compounds of Formula (I) and Formula (II) in the liquid absorbent is greater than 2:1.

5. A method according to claim 1, wherein a molar ratio of the aliphatic amine to the combined total of the compounds of Formula (I) and Formula (II) in the liquid absorbent is greater than 5:1.

6. A method according to claim 1, wherein a molar ratio of the aliphatic amine to the combined total of the compounds of Formula (I) and Formula (II) in the liquid absorbent is greater than 10:1.

7. A method according to claim 1, wherein a molar ratio of the aliphatic amine to the combined total of the compounds of Formula (I) and Formula (II) in the liquid absorbent is greater than 20:1.

8. A method according to claim 1, wherein a molar ratio of the aliphatic amine to the combined total of the compounds of Formula (I) and Formula (II) in the liquid absorbent is greater than 50:1.

9. A method according to claim 1, wherein the acid gas is selected from $CO_2$, $H_2S$, $SO_x$ and combinations thereof.

10. A method according to claim 1, wherein the acid gas comprises $CO_2$.

11. A method according to claim 1, wherein the gas stream is contacted with the liquid absorbent in a $CO_2$ absorption step, and wherein the method comprises repeatedly circulating the liquid absorbent between the $CO_2$ absorption step and a $CO_2$ desorption step.

12. A method according to claim 1, wherein the liquid absorbent is an aqueous composition comprising at least 10 wt % water.

13. A method according to claim 1, wherein each R is a hydrogen.

14. A method according to claim 1, wherein each Ar comprises a monocyclic six-membered aromatic group.

15. A method according to claim 1, wherein each Ar is selected from the group consisting of 2-pyridyl, 3-pyridyl, 4-pyridyl and phenyl.

16. A method according to claim 1, further comprising regenerating the liquid absorbent by a regeneration process comprising contacting the liquid absorbent with a hydrophobic medium and selectively extracting the degradation product into or through the hydrophobic medium, thereby producing a regenerated absorbent.

17. A method according to claim 16, further comprising separating the regenerated absorbent from the hydrophobic medium and recycling the regenerated absorbent to form at least part of the liquid absorbent.

18. A method according to claim 16, further comprising converting the extracted degradation product to form at least one regenerated amine of Formula (I).

19. A method according to claim 16, wherein the hydrophobic medium is an organic solvent.

20. A method according to claim 17, wherein the organic solvent is selected from the group consisting of aromatic hydrocarbon solvents, oxygen-containing solvents and halogenated solvents.

* * * * *